United States Patent [19]
Jones

[11] 3,782,783
[45] Jan. 1, 1974

[54] PROGRAMMED OSCILLATOR CIRCUIT AND FIXED THRESHOLD VARIABLE DUTY CYCLE PULSE GENERATOR

[75] Inventor: James J. Jones, Plano, Tex.

[73] Assignee: Texas Instruments Incorporated, Dallas, Tex.

[22] Filed: July 27, 1972

[21] Appl. No.: 275,663

[52] U.S. Cl.................................. 303/21 P, 303/20
[51] Int. Cl............................................... B60t 8/12
[58] Field of Search.................. 188/181 A; 303/20, 303/21 A, 21 P, 21 BE, 21 EB

[56] References Cited
UNITED STATES PATENTS

| | | | |
|---|---|---|---|
| 3,235,036 | 2/1966 | Meyer et al. ................... | 303/21 P X |
| 3,630,579 | 12/1971 | Rodi ............................... | 303/21 BE |
| 3,653,727 | 4/1972 | Kullberg ........................... | 303/21 P |
| 3,704,043 | 11/1972 | Hickner et al. .................. | 303/21 BE |

Primary Examiner—Duane A. Reger
Attorney—Harold Levine et al.

[57] ABSTRACT

Disclosed is a signal generator in a vehicle skid control braking system for selectively actuating a brake control means in a repetitious or pulsing mode which selectively controls the engagement and disengagement of the braking system of a vehicle in accordance with selected braking conditions and velocity conditions of the wheels of the vehicle. The signal generator comprises a programmable oscillator circuit having a programmable rate of oscillation responsive to a first input signal representing acceleration conditions of the wheels, and a pulse generator responsive to the programmable oscillator circuit for selectively generating an oscillatory output signal comprising a series of pulses. The oscillatory output signal exhibits a programmable duty cycle responsive to the acceleration condition and is effective to selectively actuate the brake control means in a repetitive pulsing manner to thereby decrease vehicle velocity.

10 Claims, 4 Drawing Figures

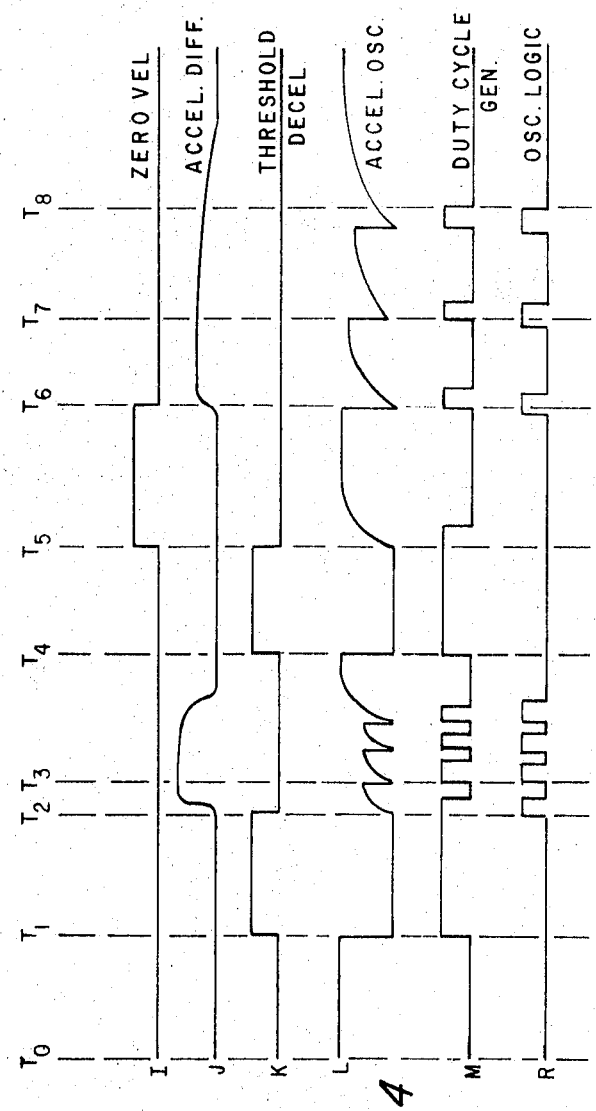
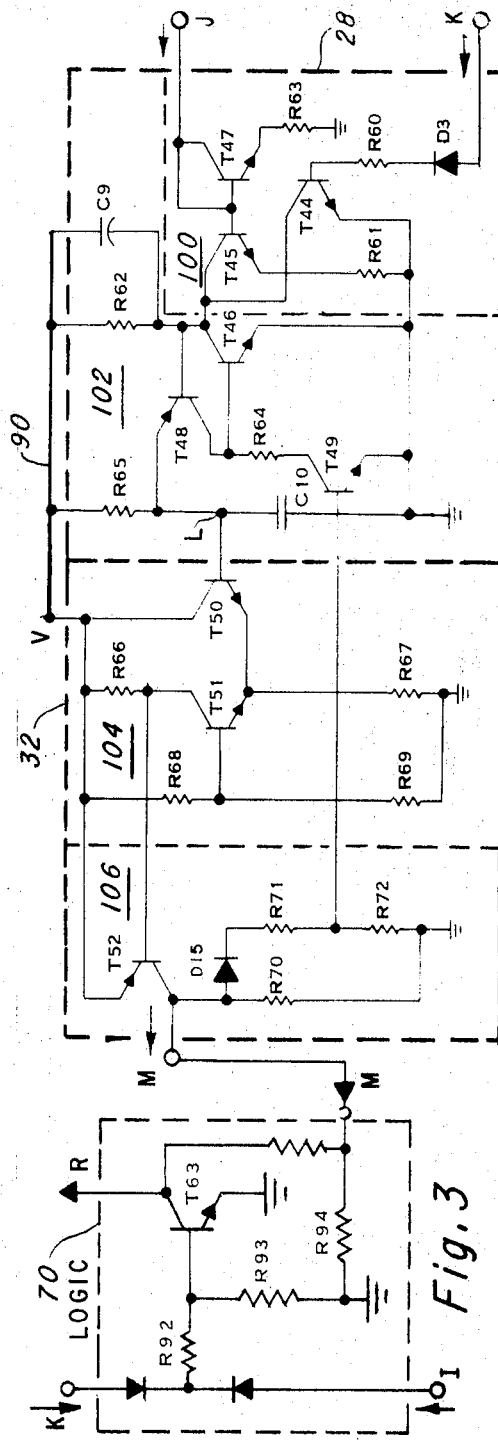
Fig. 4
Fig. 3

PROGRAMMED OSCILLATOR CIRCUIT AND FIXED THRESHOLD VARIABLE DUTY CYCLE PULSE GENERATOR

BACKGROUND INFORMATION

This invention relates to a vehicle skid control system wherein the vehicle brakes are subjected to a "pumping-type" or "pulse action" mode of operation by the system under certain operating conditions. More particularly, this invention concerns a sub-system of such a vehicle skid control system for selectively activating the braking action of the vehicle in a pulsing manner during one condition of the wheels, such as wheel acceleration.

When the operator of a land vehicle desires to stop his vehicle under emergency braking conditions or under adverse road conditions, a realistic probability exists that the land vehicle will undergo an uncontrolled skid, or a controllable skid which prevents the operator from bringing his land vehicle to a safe stop within the distance available. Under these circumstances, one factor that indicates an imminent skid is the relative relationship between vehicle wheel speed and vehicle speed. It has been readily accepted by safety experts and professional land vehicle drivers that vehicle stability can be achieved by automatically "pumping" or "pulsing" of the brakes associated with the wheels of the land vehicle in a pre-programmed manner dynamically related to the rate of acceleration and deceleration of the land vehicle.

In more recent times, several systems have been developed that operate on the principle of selectively inhibiting the normal braking action initiated by the operator of the land vehicle. In one of these systems, wheel speed sensors are utilized to generate A.C. signals that are proportional to vehicle wheel speed. The vehicle wheel speed signals are then processed through a control module which generates a D.C. voltage to energize a solenoid in an actuator that controls the hydraulic braking system to the vehicle wheels. When a skid is imminent, a command signal from the control module causes the actuator solenoid to close a vacuum passage in a diaphragm chamber. By action of the diaphragm and the normal hydraulic pressure from the master cylinder of the land vehicle braking system as developed by the operator thereof, the hydraulic pressure to the vehicle wheels is released, thereby inhibiting the vehicle wheel braking action. When the vehicle wheels spin up to the vehicle speed or to a selective lower speed, the control module produces a signal to deenergize the actuator solenoid. This in turn restores line pressure in the vehicle braking system and reapplies the vehicle brakes. In effect, what is achieved by this system is that the vehicle brakes are "pumped" or "pulsed" in a manner often recommended for controlled braking under adverse driving conditions.

The control module of the aforementioned system includes a frequency convertor for each wheel speed sensor for converting a frequency varying signal into a varying direct current signal proportional thereto. A summation of the outputs from each of the frequency convertors produces a composite of the vehicle wheel speed signals. Respective deceleration and acceleration rate detectors respond to the output of the summing amplifier for producing outputs proportional to the rate of deceleration and acceleration respectively of the wheels of the land vehicle. A signal proportional to the output of the summing amplifier is transferred to a vehicle velocity ramp generator and one input of an automatically adjustable switching circuit. The vehicle velocity ramp generator produces a step function ramp signal having an overall slope related to the actual speed of the land vehicle when braking to a stop. The automatically adjustable switching circuit also receives an input from the vehicle velocity ramp generator and an input from a retarding force detector, and produces an output whenever the summation of the wheel speed signal, the velocity ramp signal, and the retarding force signal reaches a first threshold condition. The retarding force detector produces an output signal which relates to the braking factors including tire condition, brake condition, and the condition of the road surface. To generate a control signal to the actuator solenoid, the output of the deceleration rate detector, the acceleration rate detector, and the automatically adjustable switching circuit must have a certain designated relationship. These three signals are the inputs to the brake controller as the last component in the control module.

A more detailed description of the features briefly stated above with regard to a prior known vehicle skid control system is set forth in a copending patent application, Ser. No. 25,131, filed Apr. 2, 1970, for "VEHICLE SKID CONTROL SYSTEM," which is assigned to the assignee of this application.

Another known and similar system that operates on the principle of inhibiting the normal braking action initiated by the operator of the land vehicle is set forth in U.S. Pat. No. 3,578,819, issued May 18, 1971, for "SKID CONTROL SYSTEM," in the name of Thomas M. Atkins.

OBJECTIVES OF THE INVENTION

It is an object of the present invention to provide a signal generator in a vehicle skid control braking system for selectively actuating in a controlled manner a brake control means which engages and disengages the braking system of the vehicle in accordance with selected braking conditions.

It is another object of the present invention to provide in a vehicle skid control braking system a signal generator for selectively actuating a brake control means in a repetitive or pulsing mode to control the engagement and disengagement of the braking system of a vehicle.

It is still another object of the present invention to provide in a vehicle skid control braking control system a signal generator which selectively actuates a brake control means in a repetitive or pumping mode during the condition that the wheels of the vehicle are accelerating, for selective engagement of the braking system of the vehicle to thereby reduce vehicle velocity.

It is still another object of the present invention to provide a signal generator for selectively actuating a brake control means in a vehicle skid control braking system that selectively controls the engagement and disengagement of the braking system in a controlled manner in accordance with selected braking conditions, comprising a programmable oscillator circuit having a programmable rate of oscillation responsive to a signal representing a first condition of the vehicle wheels and further comprising a pulse generator responsive to the programmable oscillator for generating a pulsed output signal exhibiting a programmable duty cycle representing the first condition for selectively actuating the braking system of the vehicle in a controlled manner to thereby decrease the vehicle velocity.

BRIEF DESCRIPTION OF THE INVENTION

An improved vehicle skid control system in which this invention is advantageously utilized includes a wheel sensor, which may be coupled to the wheels or to the drive shaft of the land vehicle, wherein the wheel sensor generates A.C. signals A having a frequency varying in accordance with vehicle wheel speed. These frequency varying signals A are coupled to a frequency convertor that produces a D.C. output signal B having a voltage magnitude that varies proportionally with the frequency of the A.C. signals A generated by the speed sensor. The varying D.C. wheel speed signals B generated by the frequency converter are coupled to a D.C. level detector and zero velocity gate circuit.

The D.C. level detector and zero velocity gate circuit performs three basic functions. First, it generates two D.C. level signals (G and H) when the frequency of the A.C. signal A is substantially zero or below a preset value with respect to vehicle wheel speed; second, it generates a zero velocity gate signal (I) when the D.C. level signal B reaches a selected D.C. level; and third, it prevents any ripple characteristics of the varying D.C. signal B coupled thereto, which frequently occur when the land vehicle is operated at low speeds, from being coupled into a deceleration differentiator circuit and to an acceleration differentiator circuit. The two D.C. level signals are coupled respectively to the deceleration and acceleration differentiator circuits, while the zero velocity gate signal I is coupled to a brake control logic circuit.

The deceleration differentiator circuit differentiates the D.C. level signal G coupled thereto, and couples a deceleration differentiator signal (O) to a variable threshold deceleration gate circuit, which in turn generates a deceleration gate signal (K) when the rate of deceleration of the vehicle wheels exceeds a preset value.

The variable threshold deceleration gate circuit has a variable threshold feature which produces an output gate signal having a "turn on" threshold at a different level than its "turn off" threshold. That is to say, the variable threshold deceleration gate circuit "turns on" at a lower threshold than it "turns off" so as to provide a desirable fast "turn off" relative to the rate of deceleration of the vehicle wheels. The variable threshold deceleration gate circuit output gate signal is then coupled to the acceleration programmer oscillator circuit of this invention.

The acceleration differentiator circuit is similar to the deceleration differentiator circuit but for the fact that it operates in response to the rate of acceleration of the vehicle wheels. This circuit differentiates the D.C. level signal H coupled thereto and couples an acceleration differentiator signal (J) to the acceleration programmed oscillator circuit of the invention.

The acceleration programmer oscillator circuit in response to the acceleration differentiator signal J produces an acceleration oscillator signal (L) that has a frequency proportional to the rate of acceleration of the vehicle wheels. This acceleration oscillator signal J is then coupled to the fixed threshold variable duty cycle pulse generator of this invention.

The fixed threshold variable duty cycle pulse generator can be programmed from zero percent to 100 percent duty cycle with respect to the output signal. This circuit produces a duty cycle gate signal (M) and couples this duty cycle gate signal M to a brake control logic circuit to provide a selective repetitive or pumping application of the vehicle braking system to thereby reduce wheel velocity during selected wheel acceleration conditions.

The brake control logic circuit comprises an oscillator logic circuit which in response to the zero velocity gate I, decel gate K, and duty cycle gate M develops output signal (R) which selectively actuates in a pumping mode the brake system of the land vehicle to reduce vehicle velocity.

BRIEF DESCRIPTION OF THE DRAWINGS

FIG. 3 represents a circuit schematic of the programmed oscillator circuit and fixed threshold variable duty cycle pulse generator of FIG. 2 in accordance with one embodiment of the present invention;

FIG. 4 graphically represents exemplary input and output waveforms illustrating a preferred mode of operation of the circuit depicted in FIG. 3.

Figure 1:
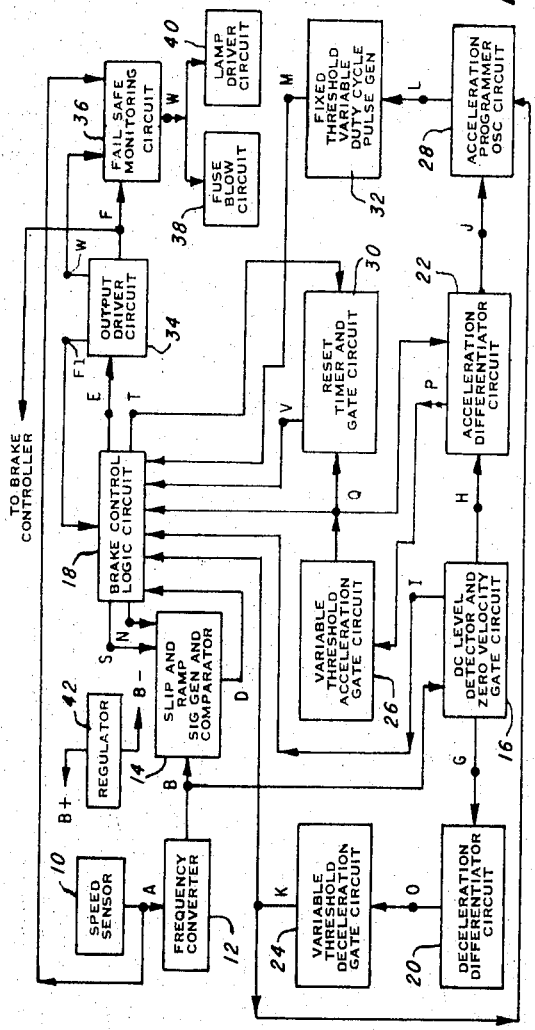
FIG. 1 is a block diagram of one embodiment of an improved vehicle skid control module for a vehicle skid control braking system.

A more complete understanding of the invention and its advantages will be apparent from the specification and claims and from the accompanying drawings illustrative of the invention.

DETAILED DESCRIPTION — FIG. 1

A detailed description of preferred embodiments of this invention follows with reference made to the drawings, wherein like parts and elements have been given like reference numerals for clarity and understanding of the novel, useful and unobvious features of this invention.

Referring to the drawings, in FIG. 1 there is illustrated in block diagram format the components of one embodiment of a control module in a vehicle skid control braking system as described in detail in copending patent application, Ser. No. 266,798, filed June 27, 1972, for IMPROVED VEHICLE SKID CONTROL SYSTEM, which is assigned to the assignee of this application. The system includes a speed sensor 10 and a frequency convertor 12. The speed sensor 10 is coupled to either the wheels or to the drive shaft of a land vehicle, e.g., electromagnetically, optically or mechanically, and generates a varying A.C. signal (A) which has frequency variations proportional to wheel speed. That is to say, the faster the wheel speed, the higher the frequency of the signal A connected to the frequency convertor 12. The variable A.C. signals A generated by the speed sensor 10 are coupled to the frequency convertor 12 wherein they are converted to a varying D.C, signal (B) having a D.C. magnitude proportional to vehicle wheel speed. The varying D.C. signal B generated by the frequency convertor 12 is coupled to both the slip and ramp signal generator and comparator 14 and the D.C. level detector and zero velocity gate circuit 16.

The slip and ramp signal generator and comparator 14 modifies or offsets the varying D.C. signal B a preselected value and produces a "slip" signal ($C_1$), and then under the control of the slip signal $C_1$, it develops a ramp signal (C) having a dynamically programmable constant current rate of discharge. The ramp signal C is then compared with the varying D.C. signal B, and when the wheel speed of the land vehicle drops below vehicle land speed, represented by signal B dropping below the ramp signal C, a "slip" gate signal (D) is generated. The slip gate signal D is then coupled to one of the inputs of the brake control logic circuit 18.

The D.C. level detector and zero velocity gate circuit 16, in response to the variable D.C. signal B generated by the frequency convertor 12, generates two output signals (G and H), each signal being clamped at a selected D.C. level of the input signal applied thereto, with such signals being respectively coupled to the deceleration differentiator circuit 20 and the acceleration differentiator circuit 22. Basically, the reason for detecting the preselected D. C. levels of the input signal B and developing output signals G and H, is to prevent any ripple characteristics of the signal applied thereto, which frequently occurs when the land vehicle is operated at low speeds, from being coupled into the deceleration and acceleration differentiator circuits 20, 22. The D.C. level detector and zero velocity gate circuit 16 develops a zero velocity gate signal (I) and couples this signal I to one input of the brake control logic circuit 18.

The deceleration differentiator 20 differentiates the variable D.C. signal G applied thereto and generates a pulse output signal (O) which signal O is coupled to the variable threshold deceleration gate circuit 24; while the acceleration differentiator 22 differentiates the variable D.C. signal H applied thereto and generates a pulse output signal (P) which signal P is coupled to the variable threshold acceleration gate circuit 26.

The variable threshold deceleration gate circuit 24 has a variable threshold feature which produces an output gate signal (K) having a "turn on" threshold at a different level than its "turn off" threshold. That is to say, the variable threshold deceleration gate circuit 24 "turns on" at a lower threshold than it "turns off" so as to provide a desirable fast "turn off" relative to the rate of deceleration of the wheels of the land vehicle. The pulse output signal K developed by the variable threshold deceleration gate circuit 24 is present when the deceleration rate of change of the vehicle wheels exceeds a preset value and is coupled to one of the inputs of the brake control logic circuit 18 and to the acceleration programmed oscillator circuit 28.

The variable threshold acceleration gate circuit 26 is similar to the variable threshold deceleration gate circuit 24 but for the fact that it is responsive to the pulse output signal P developed by the acceleration differentiator 22, and generates a pulse output signal (Q) indicative of the rate of change of acceleration of the vehicle wheel speed. The circuit also has a variable threshold feature in which the "turn on" of the circuit is at a lower threshold than the "turn off" feature of the circuit. The pulse output signal Q of the variable threshold acceleration gate circuit 26 is coupled to one of the inputs of the brake control logic 18, the acceleration differentiator circuit 22 and the reset timer and gate circuit 28.

The acceleration programmed oscillator circuit 28 receives an analog signal (J) from the acceleration differentiator 22 which programs the oscillator so as to produce a sawtooth pulse output signal (L) that has a frequency proportional to the rate of acceleration of the vehicle wheels. This output sawtooth signal L is coupled to a fixed threshold variable duty cycle pulse generator 32.

The fixed threshold variable duty cycle pulse generator 32 is programmable from zero percent to 100 percent duty cycle with respect to the output signal developed thereby M. The output signal M of the fixed threshold variable duty cycle pulse generator 32 is coupled to one of the inputs of the brake control logic circuit 18.

The reset timer and gate circuit 30 is reset by one of the outputs of the brake control logic circuit 18 (T) and commences a reset timing cycle at the end of the reset time period which develops a reset gate signal (V) for controlling the application of the output pulse signal Q generated by the variable threshold acceleration gate circuit 26 (Q) and selectively couples this output pulse signal Q to one of the inputs of the brake control logic circuit 18.

DETAILED DESCRIPTION — FIG. 2

Figure 2:
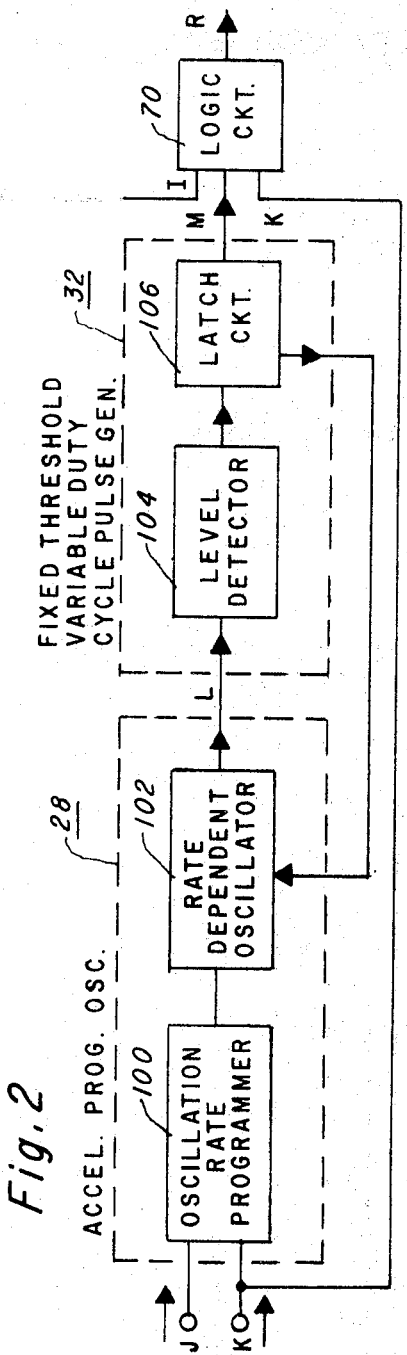
FIG. 2 is a block diagram of a programmed oscillator circuit and fixed threshold variable duty cycle pulse generator.

Referring now to FIG. 2, there is depicted the functional block diagram of the programmed oscillator circuit and fixed threshold variable duty cycle pulse generator disclosed in this application. As noted above, the circuit function embodied in FIG. 2 is particularly advantageous when utilized in the vehicle skid control braking system of FIG. 1. In such a braking system a combination of speed sensing circuits and differentiation circuits provides a signal J representative of acceleration conditions of the wheels of the vehicle. One such circuit is described in detail in copending patent application, Ser. No. 268,401, filed July 3, 1972, for ACCELERATION AND DECELERATION DIFFERENTIATOR CIRCUITS, assigned to the assignee of this Application.

When the rate of deceleration of the vehicle wheels exceeds a selected value, velocity monitoring circuits, differentiator circuits, and voltage threshold circuits generate another signal K representative of the condition that vehicle wheel deceleration has exceeded a selected value. That is, the rate of deceleration of the vehicle's wheels considered with respect to vehicle land velocity has exceeded a safe threshold value, and a skid is imminent.

The acceleration programmer oscillator 28 is responsive to signal J representing acceleration conditions of the vehicle wheels and generates a first oscillatory signal L having a rate of oscillation dependent on signal J and accordingly on the acceleration conditions of the wheels. Oscillatory output signal L typically exhibits a "sawtooth" waveform and the "sawtooth" pulses of signal L preferably exhibit varying amplitudes which provides a frequency varying signal. That is, the larger the amplitude of each pulse, the longer the time period of each pulse, and accordingly the slower the frequency of the output signal L.

The acceleration programmer oscillator 28 also is shown in FIG. 2 responsive to signal K representing a high rate of deceleration of the vehicle wheels. Signal K is effective to inhibit the oscillatory signal L upon the condition that deceleration has exceeded the selected value. Accordingly, signal L comprises periods of varying frequency indicative of signal J and periods of substantially zero frequency indicative of signal K. Although utilizing signal K in the acceleration programmer oscillator circuit 28 provides advantageous results, it is not a critical feature of the invention, as will be discussed in detail later in this application.

First oscillatory signal L exhibiting regions of "sawtooth" oscillations of varying amplitudes is monitored by a fixed threshold variable duty cycle pulse generator 32 to generate therefrom second oscillatory signal M. Second oscillatory signal M is preferably comprised of a selected sequence of pulses corresponding to the oscillations of signal L. The pulses of signal M preferably are of one magnitude and of one duration. Accordingly, by signal L actuating the circuit generator 32 at various frequencies, the output signal M exhibits a pulse train having a variable duty cycle. It is understood that the term "duty cycle" denotes that percentage of one cycle in which signal M resides in one logic state. It is therefore readily apparent that signal M has a programmable duty cycle determined by the frequency of signal L ranging from zero percent to 100 percent. A 100 percent duty cycle is shown by signal M residing in one logic state for the entire cycle and a zero percent duty cycle is exhibited by signal M residing in the other logic state for the entire cycle. A cycle is typically considered to be that portion of time between the leading edges of pulses of the acceleration signal J.

Also shown in FIG. 2 is logic circuit 70 responsive to second oscillatory signal $M$, signal $K$, and signal $I$ representative of a zero velocity wheel speed. Logic circuit 70 generates s third oscillatory signal R which is mathematically described by the logic equation $R = M \cdot \bar{K} \cdot \bar{I}$.

It was earlier noted that utilization of signal $K$ in the above described system is not a critical feature of the invention but it is advantageous. Utilization of signal $K$ provides an output signal $R$ having an additional pulse occurring immediately after lapse of the condition that vehicle wheel deceleration has exceeded the selected value. As will be shown in FIG. 4, this extra pulse is selectively inhibited by a zero velocity wheel speed condition indicated by signal I. Each of the pulses in the pulse train $R$ selectively actuate the braking system of the vehicle to thereby decrease velocity. Signal $R$ is thus actuating the brakes in a pumping manner during acceleration of the wheels and "pumps" the brake once after the wheels are no longer decelerating above the selected value; both conditions are subject to the condition that wheel velocity is not substantially zero.

The acceleration programmer oscillator 28 comprises oscillation rate programmer 100 receiving signals J and K which is coupled to rate dependent oscillator 102 providing the first oscillatory signal L. Rate programmer 100 programs the oscillator 102 proportionally to signal J (acceleration conditions of the wheels). Signal K as earlier noted programs a substantially zero oscillation rate for oscillator 102. However, it is noted that the wheels can not accelerate and decelerate simultaneously and accordingly Signals J and K are mutually exclusive. Signal J actuates the oscillator only upon the acceleration condition of the wheels and preferably provides a zero oscillation rate for all other periods. Such an observation allows utilization of only signal J as an input to programmer 100, which of course disallows the advantageous utilization of the extra pulse in output signal R upon the condition of signal K.

The fixed threshold variable duty cycle pulse generator 32 comprises a level detector 104 for monitoring the first oscillatory signal L and providing an input to the latch circuit 106 which generates signal M preferaly in one of two logic states. If signal L is less than the level of detector 104, latch circuit 106 provides signal M in one logic state and if signal L exceeds the level of detector 104, signal M is in the other logic state.

In FIG. 2, the latch circuit 106 is shown coupled to the rate dependent oscillator 102 to selectively provide signal L fully responsive to signals J and K.

DETAILED DESCRIPTION — FIG. 3

Referring now to FIG. 3, the acceleration program oscillator circuit includes an oscillation rate programmer comprising a logic circuit (T44), a current source circuit (T45, T47), and a rate dependent Oscillator 102 comprising oscillator circuit (T46, I48, T49). The logic transistor T44 receives the threshold decel gate signal K at its base via the blockinG diode D3 and limiting resistor R60. The logic transistor T44 has its emitter connected to ground and its collector connected to the V source line 90 via load resistor R62. The current source transistors T45, T47 drive the collector circuit of transistor T46 and set the voltage thereof through the load resistor R62. The current source transistor T47 receives at its collector the acceleration differentiator signal J and has its emitter connected to ground through the emitter bias resistor R63, and its base connected back to its collector and to the base of current source transistor T45, which in turn has its emitter connected to ground through the emitter bias resistor R61 and its collector connected to the collector of the logic transistor T44, and to the V source line 90 through the load resistor R62. The oscillator transistor T46 also has its collector connected to the V source line 90 through load resistor R62, with its emitter directly connected to ground and its base connected to the junction of limiting resistor R64 and the collector emitter circuit of oscillator transistor I48. Oscillator transister T48 has its emitter-base circuit connected between the collector of the oscillator transistor T46 and the V source line 90 through the emitter bias resistor R65, while its collector is connected both to the base of oscillator transistor T46 and to the collector of oscillator transistor T49 through the limiting resistor R64. The oscillator transistor T49 has its emitter connected directly to ground and its base connected to the junction of the voltage divider network including resistors R71, R72. A series R-C circuit for developing the acceleration program oscillator signal L is connected between the V source line 90 and ground that includes the resistor R65 and capacitor C10. The acceleration program oscillator signal L is developed across the capacitor C10 and is coupled to the fixed threshold variable duty cycle pulse generator 32. Thus, the capacitor C10 charges through the R65 to a voltage level that is equal to the voltage set on the collector of oscillator transistor T46 by the current source transistors T45, T47. As capacitor C10 charges to a higher value oscillator transistor T48 is driven into conduction and discharges capacitor C10 through oscillator transistors T46 and T49. Accordingly, the frequency developed by the acceleration program oscillator circuit 28 will depend upon the voltage set on the collector of oscillator transistor T46 by the current source transistors T45 and T47. That is to say, the frequency will depend upon the acceleration analog signal J developed by the acceleration differentiator circuit 22 that is coupled to the current source transistor T47 that in turn drives the collector circuit of the oscillator transistor T46.

The fixed threshold variable duty cycle pulse generator 32 includes level detector circuit 104 comprising a differentiator amplifier (T50, T51) and a latch circuit 106 comprising output amplifier (T52). The differentiator amplifier transistors T50, T51 have their emitters connected in common and to ground through the emitter bias resistor R67, while the base of transistor T50 is connected to receive the acceleration program oscilator signal L and the base of transistor T51 connected to receive the acceleration program oscillator signal L and the base of transistor T51 connected to the voltage divider including resistors R68 and R69. The collector of differentiator amplifier transistor T50 is coupled to the V source line 90 while the collector of transistor T51 is coupled to the V source line 90 through the load resistor R66. Voltage divider network R68, R69 is coupled between the V source line 90 and ground. The base circuit of the output transistor T52 is coupled to the junction of load resistors R66 and the collector of differentiator amplifier transistor T51, with its emitter directly connected to the V source line 90 and its collector connected to ground through the load resistor R70. An isolating diode D15 is coupled between the collector of output transistor T52 and divider resistors R71. The duty cycle signal M is developed across the load resistor R70 and is coupled to the oscillator logic circuit 70 via limiting resistor R94. Thus, when the voltage on capacitor C10 is below the voltage level set by the divider resistors R68 and R69, the output transistor T52 is driven into conduction so as to produce the duty cycle signal M.

The oscillator logic circuit 70 includes a logic transistor T63 that has its emitter grounded, its base connected to the junction of resistors R92 and R93 and its collector connected to receive the duty cycle signal M via resistor R95. Resistor R93 and R94 are both connected to ground with resistor R94 having its other end connected to resistor R95 and resistor R93 having its other end connected to the base of transistor T63. Resistor R92 is connected to the junction of the cathodes of the diodes D10 and D11 which in turn have their anodes respectively coupled to receive the deceleration gate K from the variable threshold deceleration gate circuit 24, and the zero velocity gate I from the zero velocity gate circuit 58.

DETAILED DESCRIPTION — FIG. 4

Operation of the programmed oscillator circuit and fixed threshold variable duty cycle pulse generator of FIG. 3 is best understood when viewing the waveforms shown in FIG. 4.

At time $T_0$ the vehicle is operating in a normal mode with the brake system disengaged, and accordingly acceleration signal J is low, indicative of zero acceleration. Signal I is low indicative of a non-zero velocity wheel speed condition. Deceleration signal K is low representing the deceleration rate below a selected value. First oscillatory signal L is high, and second and third oscillatory signals M and R are low. The operator of the vehicle then applies the brakes, and the vehicle and the wheels begin decelerating.

At time $T_1$ deceleration gate signal K goes high indicating an excessive rate of deceleration. Signal K forces logic transistor T44 to conduct, dropping the voltage on the collector of transistor T46, which lowers the voltage of the base of transistor T48, according to the discharge rate of capacitor $C_9$, causing transistor T48 to conduct. Capacitor C10 then discharges through transistor T48 and signal L is shown dropping to its low logic state. The capacitor C10 discharges through transistor T46 which becomes conductive when transistor T48 becomes conductive.

As signal L goes low on the base of differential transistor T50, transistor T51 becomes conductive forcing the base of output transistor T52 low, causing it to conduct. Accordingly, signal M is forced into the high logic state and a high voltage resulting therefrom is developed across diode D15 and resistor divider R71 – R72 and drives transistor T49 conductive, contributing to the discharge of capacitor C10, which provides a more responsive waveform L. Signal R remains low as transistor T63 becomes conductive upon the high state of deceleration signal K.

At time $T_2$, the deceleration gate signal K goes to a low logic state, indicating that the braking of the vehicle has selectively been inhibited by, for example, the output of the skid control module referenced above. As signal K goes low and prior to acceleration signal J going high, transistors T44 and T48 become non-conductive and capacitor C10 begins to charge, driving signal L high at the charging rate of capacitor C10. As signal K goes low, logic transistor T63 becomes non-conductive and signal R assumes the high state of signal M.

During the time interval $T_2 - T_3$, the wheels have begun to accelerate, as represented by acceleration signal J switching to a high logic state. Signal J is typically a current signal for supplying base drive to transistors T45 and T47. The base drive supplied by signal J going high drives transistor T45 conductive, lowering the voltage on the collector of transistor T46 and the base of transistor T48. Transistor T48 becomes conductive when its emitter is at least equal to the voltage on its base, and this voltage is established as a variable threshold by the degree of conductivity of transistors T45 and T47 operating in the linear mode. Transistor T48 begins to conduct when the charge on capacitor C10 equals this threshold voltage.

Signal L changes to a high logic state as capacitor C10 charges, and prior to time $T_3$ has exceeded the threshold established by the level detector 104, which causes output signal M to change to a low state. When signal L reaches the voltage on the base of transistor T48, and transistor T48 begins to conduct, transistor T46 is driven conductive allowing capacitor C9 to discharge therethrough, forcing the base of transistor T48 high, driving it non-conductive. This is shown at time $T_4$. Upon signal L's switching to the low logic state, signal M switches to a high logic state, and signal R follows signal M due to the absence of signals I and K.

Signal L continues to oscillate during the period signal J is high, causing the signals M and R to oscillate in response thereto. When signal J becomes substantially zero to deprive base drive to transistors T45 and T47, transistor T48 remains non-conductive and capacitor C10 charges fully, generating signal L with a high logic state.

At time $T_4$, upon excessive wheel deceleration, signal K switches to the high logic state, causing signal L to switch to low logic state, which drives output signal M to the high state. Signal R remains low, as signal K drives transistor T63 conductive.

At time $T_5$, signal K switches to the low state, and signal I switches to the high state, indicative of a zero velocity wheel speed. As signal K switches low, causing transistor T48 to become non-conductive, capacitor C10 begins to charge. During time interval $T_5 - T_6$, signal L exceeds the threshold established by the input transistors of the level detector 104, and signal M switches to a low logic state.

At time $T_6$, the wheels begin to accelerate, causing zero speed indicator signal I to switch to the low state, and signal J to switch to the high state. Signal J provides base drive to the differential transistors T45 and T47, causing capacitor C10 to discharge, and signal L to switch to the low state. As signal L switches low, signal M is actuated and signal R is actuated due to the absence of signals I and K. It is noted that the amplitude of signal J during time interval $T_6 - T_8$, is less than the amplitude of signal J during the time interval $T_3 - T_4$. As explained above, the voltage threshold established on the base of transistor T48 increases with decreased base drive, which causes a longer charging time of capacitor C10 and, accordingly, a slower frequency as desired.

After time $T_6$, signal L oscillates at a frequency proportional to the amplitude of acceleration signal J and signals M and R are responsive thereto to provide "pumping" actuation to the vehicle's braking system and thereby reduce vehicle velocity.

Although specific embodiments of this invention have been described herein, in conjunction with programmed oscillator circuits and fixed threshold variable duty cycle pulse generators, which are advantageously utilized in the vehicle skid control braking system, above described, various circuit modifications will be apparent to those skilled in the art in providing the means herein described, without departing from the scope of the invention.

What is claimed is:

1. In a vehicle skid control braking system having a brake control means that selectively controls the engagement and disengagement of the braking system of a vehicle in accordance with selected braking conditions, a signal generator for selectively actuating said brake control means comprising in combination:
   a. programmable oscillator circuit means having a programmable rate of oscillation responsive to a first input signal representing a first condition of the vehicle wheels for generating a first oscillating signal exhibiting a rate of oscillation representative of said first condition; and
   b. pulse generator circuit means responsive to said first oscillating signal for selectively generating a second oscillatory signal comprising a series of pulses and exhibiting a programmable duty cycle representing said first condition; said second oscillatory signal effective to selectively actuate said brake control means in a repetitive pulsing manner to thereby decrease vehicle wheel velocity.

2. The signal generator of claim 1 wherein said oscillator circuit means is further responsive to a second input signal representing a second condition of the vehicle wheels for selectively inhibiting said oscillator circuit means to thereby provide a substantially zero rate of oscillation during said second condition.

3. The signal generator of claim 2 wherein said first condition is rate of acceleration and said second condition is rate of deceleration exceeding a predetermined value.

4. The signal generator of claim 3 wherein said oscillating circuit means comprises:
   a. an oscillation rate programmer circuit responsive to said first and second input signals for selectively providing a varying bias signal; and
   b. a rate dependent oscillator circuit having a rate of oscillation responsive to said bias signal for providing said first oscillatory signal indicative of rate of acceleration of the vehicle wheel speed.

5. The signal generator of claim 4 wherein said pulse generator circuit means comprises:
   a. a voltage level detector responsive to said first oscillatory signal for selectively providing a detector signal when said first oscillatory signal exceeds a preselected threshold level; and
   b. a latch circuit responsive to said detector signal for providing said second oscillatory signal comprising a series of pulses indicative of acceleration, wherein said latch circuit provides said second oscillatory signal in a first logic state when said first oscillatory signal is less than said preselected level, and provides said second oscillatory signal in a second logic state when said first oscillatory signal exceeds said preselected level.

6. The signal generator of claim 2 and further including a logic circuit means responsive to said second oscillatory signal, said second input signal, and a third signal indicative of a zero wheel velocity, to provide a third oscillatory signal proportional to said second oscillatory signal in the absence of actuation by said second input signal or by said third signal, said third oscillatory signal effective to selectively activate said brake control means in a pulsing manner to thereby decrease vehicle wheel velocity.

7. The signal generator of claim 6 wherein said third oscillatory signal selectively comprises:
   a. said second oscillatory signal having pulses; and
   b. an additional pulse responsive to said second condition of the vehicle wheels.

8. The signal generator of claim 5 wherein said oscillation rate programmer comprises first and second transistors having commonly connected base terminals coupled to said first input signal.

9. The signal generator of claim 8 wherein said rate dependent oscillator comprises a third transistor coupled to said oscillation rate programmer having an output terminal for providing said first oscillatory signal which is capacitively coupled to circuit ground.

10. The signal generator of claim 9 wherein said level detector comprises fourth and fifth transistors having commonly connected emitter terminals, and the base of said fourth transistor coupled to receive said first oscillatory signal.

* * * * *